United States Patent [19]

Dannhorn et al.

[11] Patent Number: 5,711,793
[45] Date of Patent: Jan. 27, 1998

[54] LACQUER VEHICLES IN GRANULAR FORM AND FREE FROM EMULSIFYING AGENTS, AND THEIR PREPARATION

[75] Inventors: Wolfgang Dannhorn; Lutz Hoppe, both of Walsrode; Erhard Lühmann, Bomlitz; Hans-Jürgen Juhl, Walsrode, all of Germany

[73] Assignee: Wolff Walsrode AG, Walsrode, Germany

[21] Appl. No.: 759,204

[22] Filed: Dec. 4, 1996

Related U.S. Application Data

[63] Continuation of Ser. No. 386,842, Feb. 10, 1995, abandoned.

[30] Foreign Application Priority Data

Feb. 18, 1994 [DE] Germany .................. 44 05 210.3

[51] Int. Cl.$^6$ ............................................. C09D 101/18
[52] U.S. Cl. ..................... 106/169.12; 106/169.14; 106/169.15; 106/169.17; 106/169.18; 106/169.19; 106/169.25; 106/169.34; 106/169.35; 106/169.36; 106/169.37; 106/169.39; 106/169.45; 106/169.48; 524/35

[58] Field of Search .................... 106/169.12, 169.14, 106/169.15, 169.17, 169.18, 169.25, 169.34–169.37, 169.39, 169.45, 169.48; 524/35

[56] References Cited

U.S. PATENT DOCUMENTS 3,284,253  11/1966  Enders et al. .

*Primary Examiner*—David Brunsman
*Attorney, Agent, or Firm*—Sprung Kramer Schaefer & Briscoe

[57] ABSTRACT

Lacquer vehicles in granular form, wherein the lacquer vehicles in granular form are composed of 10–82 weight % cellulose ester and 18–90 weight % resin and/or plasticizer as an explosive stabilizer.

5 Claims, No Drawings

LACQUER VEHICLES IN GRANULAR FORM AND FREE FROM EMULSIFYING AGENTS, AND THEIR PREPARATION

This application is a continuation of application Ser. No. 08/386,842, filed on Feb. 10, 1995 which is now abandoned.

This invention relates to blockage-resistant, pourable lacquer vehicles based on cellulose esters and based in particular on cellulose nitrates, which are free from emulsifying agents, and relates to a method for their preparation.

Dry cellulose nitrate can very easily be caused to ignite by impact or friction. Due to legal requirements, commercially available cellulose nitrate therefore has to be treated either with a non-gelatinizing liquid dampening agent in an amount of at least 25 weight % or with a gelatinizing explosive stabilizer in a concentration of at least 18 weight %, in order thereby to reduce the hazards during storage and handling and during transport also.

The most common non-gelatinizing dampening agents for cellulose nitrates are alcohols such as ethanol, isopropanol or n-butanol, and also water. However, during the processing of NC-containing lacquers alcohols have a deleterious effect in the usual adsorption installations which are disposed downstream of coating installations for the reduction of emissions. Dampened cellulose nitrates such as these are likewise less suitable for polyurethane lacquers, since the dampening agents react with the polyisocyanates used in polyurethane lacquers to form compounds of low molecular weight, which significantly reduce the quality of the lacquer film.

DE-A 3 041 085 and US-A 3 284 253 describe cellulose nitrates which contain inert solvents (e.g. toluene) as dampening agents. They are prepared by a distillative process step which is extraordinarily expensive and which gives rise to industrial safety problems. Moreover, with all cellulose nitrates which are stabilized against explosion using non-gelatinizing dampening agents the problem exists of evaporation of the dampening agent, or of inhomogeneous distribution due to the dampening agent sinking in the drum.

Another method of stabilizing cellulose nitrate against explosion is the incorporation of gelatinizing plasticizers. Dibutyl phthalate is principally used as the plasticizer (see DE 1 203 652, DE 1 470 860 and DE 1 570 121). Such low molecular weight plasticizers contain no reactive hydrogen atoms and therefore do not react with isocyanates; however they significantly reduce the quality of the PUR lacquer film. Other disadvantages of these so-called cellulose nitrate chips are:
1. high volatility of the plasticizer at elevated processing temperatures,
2. a significant tendency to form blockages for chips comprising low-viscosity cellulose nitrates,
3. long dissolution times,
4. migration of the low molecular weight plasticizer.

DE 2 215 624 describes a method of preparing polyol-modified cellulose nitrates, wherein an aqueous emulsion is mixed with an aqueous cellulose nitrate suspension in the presence of a large amount (up to 5 weight %) of emulsifying agent and heated. After filtration, the filter cake is calendered to the desired layer thickness and dried. The products contain very many emulsifying agents which impair the properties of the lacquer, particularly its resistance to water.

DE 3 836 779 describes cellulose ester-polyacrylate granules. These are prepared by the polymerization of acrylic acid or acrylate monomers in aqueous emulsion in the presence of at least one cellulose ester. Water-soluble dispersing agents are not used for the preparation of the emulsion. The dispersing agents used are incorporated in the granular material during polymerization. It is known that such protective colloids significantly impair the properties of the lacquer. Another disadvantage of this method is that polymerization does not proceed to completion, and residual monomers are present. The content of residual monomers imparts an intensive characteristic odour to these cellulose ester-polyacrylate granules.

DE-A 4 039 195 describes a similar method for the preparation of lacquer vehicle granules. An emulsion comprising a polymer and a monomer is added to an aqueous suspension of a cellulose ester, followed by polymerization. Emulsifying agents have to be added for the preparation of the aqueous emulsion of polymer and monomer. The same disadvantages occur as in DE 3 836 779.

DE-A 4 213 878 describes a method of preparing cellulose ester-polymer combinations in which the use of polymerizable monomers can be avoided. However, an emulsifying agent, which considerably impairs the properties of the lacquer, is again necessary for preparing the granules.

The object of the present invention is to provide blockage-resistant, pourable lacquer vehicles in granular form, which do not have the aforementioned disadvantages. The object is also to provide a method of preparation which is free from solvent, emulsifying agent and monomer.

Surprisingly, this object can be achieved by the combination of cellulose ester suspensions with at least one resin- and/or plasticizer emulsion.

The lacquer vehicles in granular form according to the invention are preferably composed of 10–82 weight %, particularly 30–82 weight %, of cellulose ester, and 18–90%, particularly 18–70 weight %, of resin and/or plasticizer as an explosive stabilizer.

It has surprisingly been found that lacquer vehicles are obtained in the form of solid granules if a resin- and/or plasticizer emulsion is added to a cellulose ester suspension. An emulsion such as this is obtained if the resin and/or the plasticizer contains free acid groups. Carboxyl groups and/or sulphonic groups are preferred.

The inverse route is also possible for preparing granules, namely the addition of the aqueous cellulose ester suspension to the aqueous resin- and/or plasticizer emulsion.

Products with acid numbers >10 mg KOH/g polymer are generally required as the resins and/or plasticizers to be used. It has also surprisingly been found that resins and/or plasticizers which have a content of acid groups corresponding to an acid number of 0–10 mg KOH/g polymer can be converted to aqueous emulsions by admixture with self-emulsifying polymers, as described in DE-A-4 219 768, for example. The term "self-emulsifying polymers" is to be understood as those macromolecules which produce emulsions with water with the aid of dispersion equipment.

It is characteristic of the conversion of the resin and/or plasticizer into aqueous emulsions that no emulsifying agent, which would otherwise be customary, is required. If necessary the emulsion is prepared by selective neutralization with alkalies. Moreover, no organic solvent is necessary for the preparation of the emulsion.

If the resin and/or the plasticizer to be used is self-emulsifying, the resin and/or the plasticizer can be converted into an aqueous emulsion without neutralization with alkalies. The resin and/or the plasticizer generally has to have an acid number of >10 mg KOH/g product for this purpose.

If the resin and/or the plasticizer to be used is not self-emulsifying, the resin and/or the plasticizer can be converted into an aqueous emulsion by selective neutralization with alkalies, such as ammonia, ethylamine, diethylamine, triethylamine, triethanolamine, sodium acetate, calcium hydrogen carbonate, ammonium hydrogen phosphate, potassium hydroxide and sodium hydroxide, for example. Triethanolamine and ammonia are particularly suitable. In general the resin and/or the plasticizer must have an acid number of >10 mg KOH/g product for this purpose.

If the acid number of the resin and/or plasticizer to be used is between 0 and 10 mg KOH/g product, the resin and/or the plasticizer can be converted into an emulsion by additionally adding 0.1–8 weight % of a self-emulsifying polymer, as described in DE-A-4 219 768 for example, and subsequent neutralization with the aforementioned reagents.

Emulsification is effected by mixing the resin and/or the plasticizer by stirring, using known methods of emulsion technology. Dissolvers, ultrasonic mixers, nozzle mixers, flow dispersers and combinations of these methods are suitable as emulsifying devices.

The following groups of products are suitable as resins and/or plasticizers: saturated polyesters, unsaturated polyesters, alkyd resins, polyethers, polyacrylates, ketone resins, maleic resins, polycaprolactones, polyurethanes, epoxy resins, polyvinyl resins, amino resins, phenol resins, silicone resins, phthalates, adipates, sebacates, phosphoric acid esters, azelaic acid esters, esters of higher fatty acids, glycollic acid esters, trimellitic acid esters, sulphonic acid esters, citric acid esters, sulphonic acid amide, epoxidized plasticizers such as epoxidized esters of natural fatty acids, and epoxidized triglycerides such as epoxidized soya bean oil or linseed oil, esters of natural resins such as the esters of rosin or hydrated rosin, sugar derivatives such as saccharose acetoisobutyrate, polymerizable plasticizers and flame-retardant plasticizers such as trichlorobutyl phosphate, trichloroethyl phosphate or diphenyl octyl phosphate, as well as ethoxylated derivatives of the aforementioned products, such as ethoxylated phosphoric acid esters, for example.

All cellulose esters prepared from inorganic and organic acids and celluloses which are insoluble in water are suitable as cellulose esters. Cellulose nitrates with a nitrogen content of 10–12.6 weight % are particularly preferred.

For the preparation of the lacquer vehicles in granular form according to the invention, the emulsion of the resins and/or plasticizers to be used is preferably added to the cellulose ester suspension at 5° to 40° C., most preferably at 10° to 30° C. After the resin and/or the plasticizer has been absorbed on the cellulose ester fibres, stabilization of the cellulose ester granules is effected at temperatures between 20° and 100° C., preferably 40° to 90° C., for a period of 20 minutes to 3 hours, preferably 30 minutes to 2 hours.

If a resin and/or plasticizer emulsion neutralized with alkalies has been used, the mixture of emulsion and suspension should be acidified with inorganic or organic acids before and/or during the heating phase when a cellulose nitrate suspension is employed. Suitable organic acids comprise acetic acid, propionic acid, adipic acid, glutaric acid, citric acid, ascorbic acid and benzoic acid, for example. All inorganic acids can also be used, such as phosphoric acid, sulphuric acid, nitric acid or hydrochloric acid. Ascorbic acid, citric acid and phosphoric acid are particularly preferred.

The lacquer vehicles in granular form according to the invention can be separated by common methods of separation, such as centrifuging or filtration. Drying is effected in known tray-, belt- or fluidized bed driers.

The resulting lacquer vehicles in granular form are characterized by a narrow particle size distribution and by their outstanding pourability. The proportion of fine dust is very low compared with other products containing cellulose esters.

Depending on the resin and/or plasticizer used, the lacquer vehicles according to the invention are suitable for the production of lacquers for various areas of application, e.g. for wood, metal, plastics, paper, foil, leather and magnetic data media. The lacquer vehicles are compatible with other lacquer constituents. When polymers containing hydroxyl groups are used as the resin, very high quality polyurethane lacquer coatings can be obtained by the isocyanate reaction, using aliphatic, aromatic, aryl-aliphatic and capped isocyanates. Another area of application for the lacquer vehicles is their use for coating packaging material.

EXAMPLE 1

40 g of an unsaturated polyester emulsifiable in water (Example 3 of DE-A 4 219 768), consisting of 0.03 moles polyethylene glycol 1500, 0.55 moles propane-1,2-diol, 0.40 moles benzyl alcohol, 0.04 moles trimethylolpropane, 0.60 moles trimethylolpropane diallyl ether and 1.00 moles maleic anhydride with an acid number of 21 mg KOH/g polymer were emulsified in 60 g water at room temperature in a dissolver. The stirring speed was 500 rpm.

This emulsion was stirred into a suspension of 160 g cellulose nitrate of standard type E 34 and 740 g water at room temperature. After adding the emulsion the mixture was heated to 70° C. The mixture was acidified at 40° C. with 1 g citric acid monohydrate. When the batch had reached 70° C. it was stirred for a further 30 minutes at this temperature. After cooling to room temperature the suspension of granules obtained was filtered and the solid was dried to constant weight in a fluidized bed drier at 50° C. The cellulose nitrate-polyester granules were free-flowing and readily soluble in ethyl acetate. The yield was 99.4% theoretical.

EXAMPLE 2

A repeat of Example 1, except that cellulose nitrate standard type M 27 was used instead of standard type E 34. A granular cellulose nitrate-polyester material was obtained which was free-flowing and readily soluble in ethyl acetate. The yield was 99.1% theoretical.

EXAMPLE 3

A repeat of Example 1, except that only 80 g cellulose nitrate standard type E 34 were used instead of 160 g. After filtration and drying to constant weight at 50° C. a granular cellulose nitrate-polyester material was obtained of composition 60 weight % cellulose nitrate/40 weight % polyester. The granules were free-flowing and readily soluble in ethyl acetate. The yield was 98.3% theoretical.

EXAMPLE 4

40 g Desmophen® 1300 (a saturated polyester manufactured by Bayer AG) with an acid number of 20 mg KOH/g polymer were heated to 100° C. and emulsified in 60 g of 0.2% aqueous ammonia heated to 35° C. The stirring speed of the dissolver was 500 rpm. After adding the Desmophen® the mixture was cooled to 20° C. and sheared for a further 30 minutes at 50 rpm.

This Desmophen® 1300 emulsion was added rapidly at room temperature with stirring at 500 rpm to an NC suspension consisting of 160 g cellulose nitrate of standard type A 30 and 740 g water. The mixture was heated after the addition. At 40° C. it was acidified with 2 g citric acid monohydrate and heated to 80° C. This temperature was maintained for 30 minutes. After cooling to room temperature the granular cellulose nitrate-Desmophen® 1300 material was filtered and dried to constant weight at 50° C. The granular material obtained was free-flowing and readily soluble in ethyl acetate. The yield was 98.9% theoretical.

EXAMPLE 5

140 g of an unsaturated polyester, consisting of 26.60 weight % propylene glycol, 31.90 weight % maleic anhydride, 3.7 weight % trimethylolpropane and 37.8 weight % butyldiglycol with an acid number of 27 mg KOH/g polymer, were added to 122 g water and 18 g triethanolamine and emulsified in a dissolver for 30 minutes at 750 rpm.

240 g of this emulsion were stirred into a suspension of 480 g cellulose nitrate standard type A 30, 2274.5 g water and 2.6 g of 85% phosphoric acid at 500 rpm, subsequently heated to 70° C. and maintained at this temperature for 2 hours. After filtration and drying to constant weight at 50° C. a pourable granular material was obtained which readily dissolved in ethyl acetate. The yield was 98.2% theoretical.

EXAMPLE 6

90 g SAIB (sucrose acetoisobutyrate, manufactured by Eastman) with an acid number of 0 mg KOH/g polymer were mixed with 10 g of the unsaturated, water-emulsifiable polyester used in Example 1 and heated to 100° C. 83 g of 0.3% aqueous ammonia were dispersed in this mixture at 1200 rpm by means of a dissolver. The emulsion was ready for use after stirring for 10 minutes.

51 g of this emulsion were stirred into a suspension of 112 g cellulose nitrate of standard type A 30 and 536 g water. The mixture was subsequently heated to 90° C. and maintained at this temperature for 90 minutes. 0.5 g citric acid were added at 40° C. during the heating phase. After cooling the solid was separated by filtration and subsequently dried to constant weight at 50° C. The granular material, which was of medium particle size, was pourable and dissolved readily in ethyl acetate. The yield was 98.3% theoretical.

EXAMPLE 7

140 g of an unsaturated polyester, consisting of 32.8 weight % maleic anhydride and 67.2 weight % 1,6-hexanediol with an acid number of 34 mg KOH/g polymer, were added to 122 g water and 18 g triethanolamine and emulsified in a dissolver for 30 minutes at 750 rpm.

240 g of this emulsion were stirred into a suspension of 480 g cellulose nitrate of standard type A 30, 2274.5 g water and 2.6 g of 85% phosphoric acid at 500 rpm. The mixture was subsequently heated to 70° C. and held at this temperature for 2 hours. After filtration and drying to constant weight at 50° C. a pourable granular material was obtained, which dissolved readily in ethyl acetate. The yield was 97.6% theoretical.

EXAMPLE 8

6 g of triethanolamine are added to 60 g of an unsaturated polyester consisting of 16.1% by weight of ethylene glycol, 46.3% by weight of maleic anhydride, 2.5% by weight of trimethylolpropane and 35.1% by weight of 1-butanol with an acid number of 36 mg KOH/g of polymer. After adding 54 g of water to this mixture it is emulsified in a dissolver for 3 minutes at 1000 r.p.m.

The resulting emulsion is stirred into a suspension consisting of 312.7 g of cellulose nitrate of standard type A 30, 1558.3 g of water and 2.0 of 85% phosporic acid, at 750 r.p.m. The mixture is then heated at 80° C. at 500 r.p.m. and this temperature is maintained for 1.5 hours. After filtration and drying at 60° C. to constant weight, a free-flowing granular material is obtained in a 98% yield. This granular material forms a clear solution in ethanol at a concentration of 20%.

COMPARATIVE EXAMPLE 1

40 g Desmophen® 1300 (a saturated polyester manufactured by Bayer AG) heated to 100° C., with an acid number of 20 mg KOH/g polymer, were emulsified in 60 g water at 35° C. using a dissolver at 500 rpm. After switching off the dissolver an organic and an aqueous phase were formed. No granular material could be prepared using this mixture.

COMPARATIVE EXAMPLE 2

90 g SAIB (manufactured by Eastman) with an acid number of 0 mg KOH/g polymer were heated to 100° C. and mixed with 83 g of an 0.3% aqueous ammonia solution by means of a dissolver at 1000 rpm. No emulsion was formed. The mixture was unstable and was unsuitable for the preparation of granules.

We claim:

1. Cellulose nitrate granules, which are stabilized against explosion and which are preparable, without the use of solvents, emulsifying agents or monomers, by
   a) mixing a suspension of cellulose nitrate with an aqueous emulsion of a self-emulsifying resin, a self-emulsifying plasticizer, or both, to form a suspension of cellulose nitrate granules, and separating said granules from said suspension, or
   b) mixing a suspension of cellulose nitrate with an aqueous emulsion formed by mixing
      i) a non self-emulsifying resin having an acid number >10 mg KOH/g, a non self-emulsifying plasticizer having an acid number >10 mg KOH/g, or both, with
      (ii) water and
      (iii) a neutralizing agent selected from the group consisting of ammonia, ethylamine, diethylamine, triethylamine, triethanolamine, sodium acetate, calcium hydrogen carbonate, ammonium hydrogen phosphate, potassium hydroxide and sodium hydroxide, and then
   acidifying the resulting mixture of said suspension and said aqueous emulsion, to form a suspension of cellulose nitrate granules, and separating said granules from said suspension, or
   c) mixing a suspension of cellulose nitrate with an aqueous emulsion formed by
      mixing iv) a non self-emulsifying resin having an acid number between 0 and 10 mg KOH/g, a non self-emulsifying plasticizer having an acid number between 0 and 10 mg KOH/g, or both, with v) a self-emulsifying polymer, to form a mixture and mixing said mixture with vi) water and vii) a neutralizing agent selected from the group consisting of ammonia, ethylamine, diethylamine, triethylamine, triethanolamine, sodium acetate, calcium hydrogen carbonate, ammonium hydrogen phosphate, potassium hydroxide and sodium hydroxide, to form an emulsion, and then,
   acidifying the resulting mixture of said suspension and said aqueous emulsion to form a suspension of cellulose nitrate granules, and separating said granules from said suspension.

2. Granules according to claim 1, wherein the resin or plasticizer comprises at least one member selected from the group consisting of saturated polyesters, unsaturated polyesters, alkyd resins, polyethers, polyacrylates, ketone resins, maleic resins, polycaprolactones, polyurethanes, epoxy resins, polyvinyl resins, amino resins, phenol resins, silicone resins, phthalates, adipates, sebacates, phosphoric acid esters, azelaic acid esters, esters of higher fatty acids, glycollic acid esters, trimellitic acid esters, sulphonic acid esters, citric acid esters, sulphonic acid amide, epoxidized esters of natural fatty acids, epoxidized triglycerides, esters of natural resins, sugar derivatives, polymerizable plasticizers, trichlorobutyl phosphate, trichloroethyl phosphate, diphenyl octyl phosphate, and epoxylated derivatives thereof.

3. Granules according to claim 1, wherein the cellulose nitrate has a nitrogen content of 1–12.6 weight %, the resin or plasticizer being substantially free of dispersing agents and being self-emulsifying.

4. A method of producing a lacquer which comprises pouring into a lacquer base free flowing granules according to claim 1.

5. A lacquer produced by the process of claim 4.

\* \* \* \* \*

UNITED STATES PATENT AND TRADEMARK OFFICE
CERTIFICATE OF CORRECTION

PATENT NO. : 5,711,793
DATED : January 27, 1998
INVENTOR(S) : Dannhorn, et al.

It is certified that error appears in the above-identified patent and that said Letters Patent is hereby corrected as shown below:

Col. 7, last line   Delete " of " and substitute -- or --

Signed and Sealed this

Nineteenth Day of January, 1999

Attest:

Attesting Officer

*Acting Commissioner of Patents and Trademarks*